(12) United States Patent
Takami (10) Patent No.: US 11,265,475 B2
(45) Date of Patent: Mar. 1, 2022

(54) IMAGE CAPTURING APPARATUS, CLIENT APPARATUS, METHOD FOR CONTROLLING IMAGE CAPTURING APPARATUS, METHOD FOR CONTROLLING CLIENT APPARATUS, AND NON-TRANSITORY COMPUTER-READABLE STORAGE MEDIUM

(71) Applicant: CANON KABUSHIKI KAISHA, Tokyo (JP)

(72) Inventor: Shinjiro Takami, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/830,553

(22) Filed: Mar. 26, 2020

(65) Prior Publication Data

US 2020/0322537 A1 Oct. 8, 2020

(30) Foreign Application Priority Data

Apr. 5, 2019 (JP) .............................. JP2019-073075

(51) Int. Cl.
*H04N 5/232* (2006.01)
*H04N 5/265* (2006.01)
(Continued)

(52) U.S. Cl.
CPC ..... *H04N 5/23296* (2013.01); *H04N 5/23206* (2013.01); *H04N 5/265* (2013.01); *H04N 5/272* (2013.01)

(58) Field of Classification Search
CPC ........... H04N 5/23206; H04N 5/23296; H04N 5/265; H04N 5/272; H04N 5/23216; H04N 5/23299; H04N 1/32149; H04N 1/00244; H04N 1/32771; H04N 1/32773; H04N 1/32778; H04N 19/132; H04N 21/4318; H04L 29/08; H04L 29/08081;
(Continued)

(56) References Cited

U.S. PATENT DOCUMENTS

| 7,103,152 B2 * | 9/2006 | Naidoo .................. H04M 11/04 379/37 |
| 9,306,809 B2 * | 4/2016 | Dawes .................... G06F 15/13 709/225 |

(Continued)

FOREIGN PATENT DOCUMENTS

| JP | 2012090062 A | 5/2012 |
| JP | 2017056720 A | 3/2017 |

*Primary Examiner* — Marly S Camargo
(74) *Attorney, Agent, or Firm* — Venable LLP (57) ABSTRACT

An image capturing apparatus comprising an image capturing unit, a communication unit and a control unit that controls communication by the communication unit, wherein the control unit determines whether a predetermined setting has been made on the image capturing apparatus, upon receiving, from the client apparatus via the local network, a connection request for connecting the image capturing apparatus and the cloud server via an Internet, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction.

21 Claims, 7 Drawing Sheets

(51) Int. Cl.
  *H04N 5/272* (2006.01)
  *G08B 13/196* (2006.01)
  *H04N 1/00* (2006.01)
  *H04L 29/08* (2006.01)

(58) Field of Classification Search
  CPC ......... H04L 29/06625; H04L 29/08288; H04L 29/06047; H04L 41/5003; G01S 3/7864; G08B 13/19656; G08B 13/19678; G08B 13/19682; G08B 13/19689; G06F 3/1224; G06F 7/764; G06F 9/30018; G06F 9/4812; G06F 11/1479

USPC ....... 725/105, 98, 118; 348/143, 222, 240.1, 348/39, 208.3, 211.3
  See application file for complete search history.

(56) References Cited

U.S. PATENT DOCUMENTS

| | | | |
|---|---|---|---|
| 10,055,956 B2* | 8/2018 | Kozakura | G08S 13/196 |
| 10,455,145 B2* | 10/2019 | Yanagisawa | H04N 5/23216 |
| 10,559,193 B2* | 2/2020 | Naidoo | G08C 17/02 |
| 10,875,784 B1* | 12/2020 | Honjo | H04N 21/4622 |
| | | | 725/133 |
| 2008/0270569 A1* | 10/2008 | McBride | G06F 15/16 |
| | | | 709/217 |
| 2008/0309760 A1* | 12/2008 | Jayner | G08B 13/1928 |
| | | | 348/143 |
| 2010/0194882 A1* | 8/2010 | Belsarkar | H04N 1/18 |
| | | | 348/143 |
| 2012/0092496 A1* | 4/2012 | Kozakura | H04N 7/18 |
| | | | 348/143 |
| 2014/0118545 A1* | 5/2014 | Iwasaki | H04N 7/18 |
| | | | 348/143 |
| 2017/0078149 A1* | 3/2017 | Utoh | H04L 41/0883 |
| | | | 709/222 |
| 2018/0013958 A1* | 1/2018 | Nakata | H04N 7/183 |
| 2018/0295271 A1* | 10/2018 | Kim | H04N 5/23216 |
| 2020/0358926 A1* | 11/2020 | Iwse | H04N 1/4486 |

* cited by examiner

FIG. 8

IMAGE CAPTURING APPARATUS, CLIENT APPARATUS, METHOD FOR CONTROLLING IMAGE CAPTURING APPARATUS, METHOD FOR CONTROLLING CLIENT APPARATUS, AND NON-TRANSITORY COMPUTER-READABLE STORAGE MEDIUM

BACKGROUND OF THE INVENTION

Field of the Invention

The present disclosure relates to an image capturing apparatus, a client apparatus, a method for controlling an image capturing apparatus, a method for controlling a client apparatus, and a non-transitory computer-readable storage medium.

Description of the Related Art

It has become possible for a user using a cloud service, after having connected a monitoring camera within a local network to a cloud server, to cause the monitoring camera to receive video or make various settings for the monitoring camera from PCs or smart phones via the cloud. When attempting to provide a service via the cloud server in the aforementioned manner, it is impossible to initiate a connection from the cloud to the monitoring camera because the monitoring camera is installed within a local network having a firewall installed therein, and accordingly it is necessary to make a connection from the monitoring camera to the cloud.

In order to make a connection from the monitoring camera to the cloud, an administrator or a service personnel of the monitoring camera is required, using a browser or a setting tool from a PC connected to the same local network, for the cloud connection setting of a cloud connection destination URL or the like. After having started a connection to the cloud and established communication based on the content of the aforementioned connection settings, the monitoring camera can accept, from the cloud, a video streaming request, video settings of the monitoring camera, a control request such as PTZ control or the like.

With regard to cloud settings, Japanese Patent Laid-Open No. 2017-56720 discloses a technique that allows a user to easily make cloud connection settings by using an information processing apparatus such as a multi-function apparatus to simplify the cloud connection setting or to report network abnormalities or the like at the time of connection. The technique disclosed in Japanese Patent Laid-Open No. 2017-56720; or known monitoring cameras that can connect to a cloud are assumed to utilize the cloud connection, and therefore a cloud connection is started immediately upon the completion of the cloud connection setting.

For a monitoring camera that starts a cloud connection immediately after having completed a cloud connection setting as described above, when an administrator or a service personnel makes cloud connection settings during a camera initial setting for the monitoring camera via a local network, a cloud connection may unintentionally start upon the completion of the connection setting, which results in a connection to the cloud. For example, let us consider a case where the administrator attempts to make privacy mask settings (settings that mask a part of a captured image from the viewpoint of privacy protection) as a camera initial setting sequence, after having made cloud connection settings. In this case, receiving a video streaming request from the cloud immediately after having completed a cloud connection setting may cause, since the privacy mask settings have not been completed, an unmasked raw image to be streamed to the cloud, and therefore it may become difficult to ensure security.

SUMMARY OF THE INVENTION

The present disclosure provides a technique that makes it possible to prevent unintended cloud connection during an initial setting of a monitoring camera.

An image capturing apparatus, comprising, an image capturing unit, a communication unit configured to be communicable with a cloud server via at least an Internet and a control unit configured to control communication by the communication unit, wherein the communication unit is further communicable with a client apparatus via a local network, the control unit determines whether a predetermined setting has been made on the image capturing apparatus, upon receiving, from the client apparatus via the local network, a connection request for connecting the image capturing apparatus and the cloud server via the Internet, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction, and the control unit, upon determining that the predetermined setting has been made, controls the communication unit to connect to the cloud server via the Internet, according to the connection request, and upon determining that the predetermined setting has not been made, controls the communication unit to connect to the cloud server via the Internet according to the connection request, after the predetermined setting has been made or after having received a further instruction for connecting the image capturing apparatus and the cloud server via the Internet.

Further features of the invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments, and together with the description, serve to explain the principles of the invention.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Embodiment 1

Figure 1A:
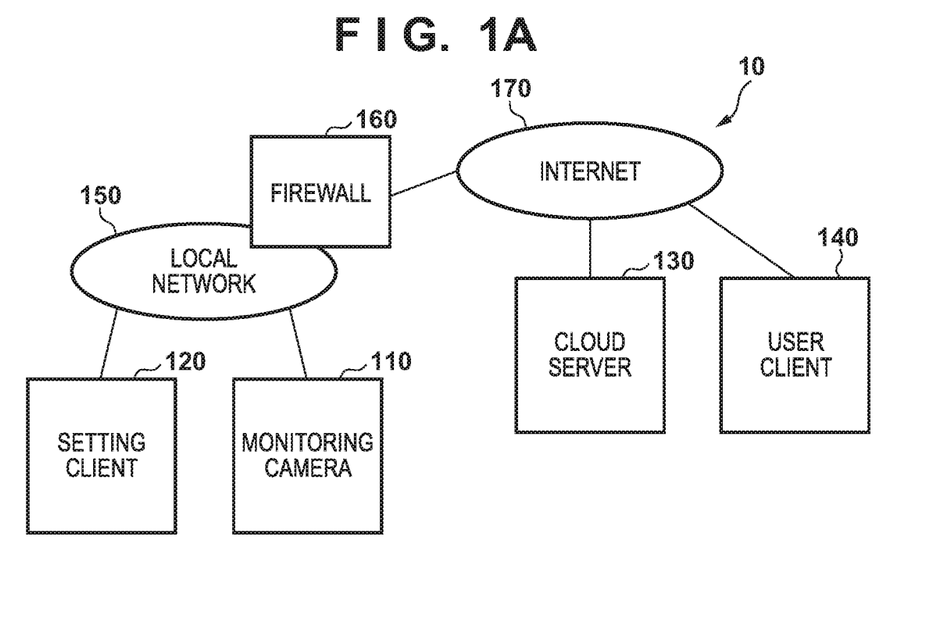
FIG. 1A illustrates an example of the configuration of a system 10 corresponding to an exemplary embodiment.

In the following, described is a system configuration according to an exemplary embodiment, referring to FIG. 1A. FIG. 1A illustrates an example of a configuration of a system 10 according to the embodiment. In the system 10, a monitoring camera 110 is an image capturing apparatus configured to image capture a predetermined area within a monitored region to generate and output a captured image. In the system 10, there may be one or more monitoring cameras 110. The monitoring camera 110 and a setting client (setting client apparatus) 120 are communicably connected to each other via a local network 150. The local network 150 can be configured as a communication line that allows for IP-based communication, such as a Local Area Network (LAN), for example.

The setting client 120 is an information processing apparatus configured to transmit, to the monitoring camera 110, cloud connection settings, privacy mask settings, a request to acquire an HTML page for setting a PTZ (pan/tilt/zoom) movable range, or a setting request for the aforementioned setting. The monitoring camera 110 transmits a response to the aforementioned request or an HTML page to the setting client 120.

A cloud server 130, which is an external server communicable with the monitoring camera 110 via the local network 150 or Internet 170, can hold captured images by the monitoring camera 110, for example.

In the system 10, however, the local network 150 is connected to Internet 170 via a firewall 160, and therefore a connection from the cloud server 130 to the monitoring camera 110 is blocked by the firewall 160. Accordingly, a connection request must be provided from the monitoring camera 110 to the cloud server 130 in order to realize communication between the monitoring camera 110 and the cloud server 130. The monitoring camera 110 makes a connection to the cloud server 130 based on cloud connection settings including a cloud connection destination URL which has been set by the setting client 120.

After completion of the connection between the monitoring camera 110 and the cloud server 130, the cloud server 130 transmits, to the monitoring camera 110, an image streaming request or a setting request for image settings or the like. The monitoring camera 110 transmits a response to the aforementioned request or an image to the cloud server 130.

A user client (user client apparatus) 140 is an information processing apparatus communicably connected to the cloud server 130 via Internet 170. The user client 140 transmits, to the cloud server 130, a request such as an image streaming request, PTZ control, camera settings, or the like. Upon receiving a request from the user client 140, the cloud server 130 provides the monitoring camera 110 with a request to receive a response and transmits, to the user client 140, an image or a response to the aforementioned request.

Next, referring to FIG. 1B, there will be described an example of a hardware configuration of the monitoring camera 110, among the nodes forming the system 10. As a hardware configuration of the monitoring camera 110 of the present embodiment, there are a CPU 201, a primary storage device 202, a secondary storage device 203, an operation unit 204, an image capture interface (I/F) 205, a network I/F 207, and a camera control I/F 208, connected to each other via an internal bus 209. Here, the CPU 201 performs control of the operation of the monitoring camera 110 comprehensively and performs control and input/output of each component. The primary storage device 202 is a read-and-writable high-speed storage device represented by a RAM, on which the OS and various programs, or various data are loaded, and is also used as a work area of the OS and various programs. The primary storage device 202 functions as a main memory, a work area, or the like of the CPU 201. When performing a process, the CPU 201 can realize various functional operations by loading required programs or the like from the secondary storage device 203 on the primary storage device 202 and by executing the programs or the like.

The secondary storage device 203, which is a non-volatile storage device represented by a flash memory, a ROM, an HDD, an SD card or the like, is used as a permanent storage area for the OS and various programs, or various data and is also used as a temporary storage area for various data. The programs may be stored in an external memory or a removable storage medium (not illustrated).

The operation unit 204, being formed of a button, a cross key, a touch panel, or the like, accepts operation input to the monitoring camera 110. The image capture I/F 205, having a camera unit 206 connected thereto as an image capturing unit including an image sensor such as a CCD or a CMOS; and a lens, converts and compresses image data acquired from the camera unit 206 into a predetermined format and transfers the converted and compressed image data to the primary storage device 202. The camera unit 206 is also connected to the camera control OF 208, and various camera controls are transferred to the camera unit 206, the results of which are returned to the camera control OF 208. The network I/F 207, which is an I/F for connecting to the aforementioned local network 150, conducts communication with the setting client 120 or the like via a communication medium such as Ethernet.

Figure 1B:
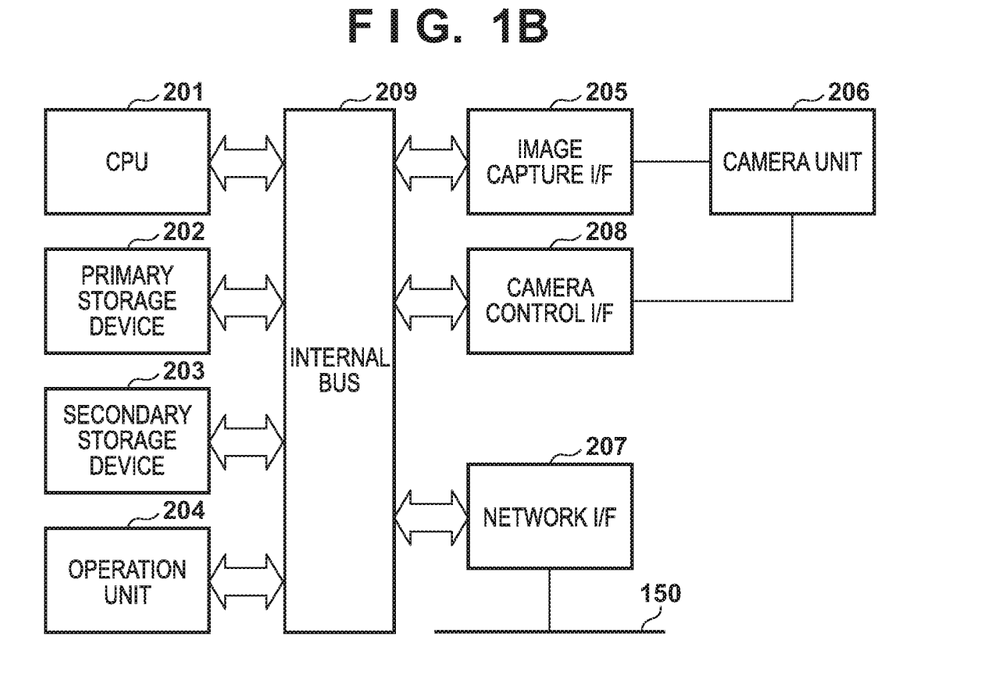
FIG. 1B illustrates an example of a hardware configuration of the monitoring camera 110 corresponding to the exemplary embodiment.

A part or all of the functions of each component of the monitoring camera 110 illustrated in FIG. 1B can be realized by executing a program by the CPU 201. However, at least a part of the components of the monitoring camera 110 illustrated in FIG. 1B may be configured to operate as a dedicated hardware. In this case, the dedicated hardware operates based on control by the CPU 201.

Although FIG. 1B illustrates an example of the hardware configuration of the monitoring camera 110, the configuration of the setting client 120, the cloud server 130, and the user client 140 can also be similar to the hardware configuration illustrated in FIG. 1B. For example, the aforementioned devices may also be configured to include at least the CPU 201, the primary storage device 202, the secondary storage device 203, and the operation unit 204 illustrated in FIG. 1B.

Figure 2:
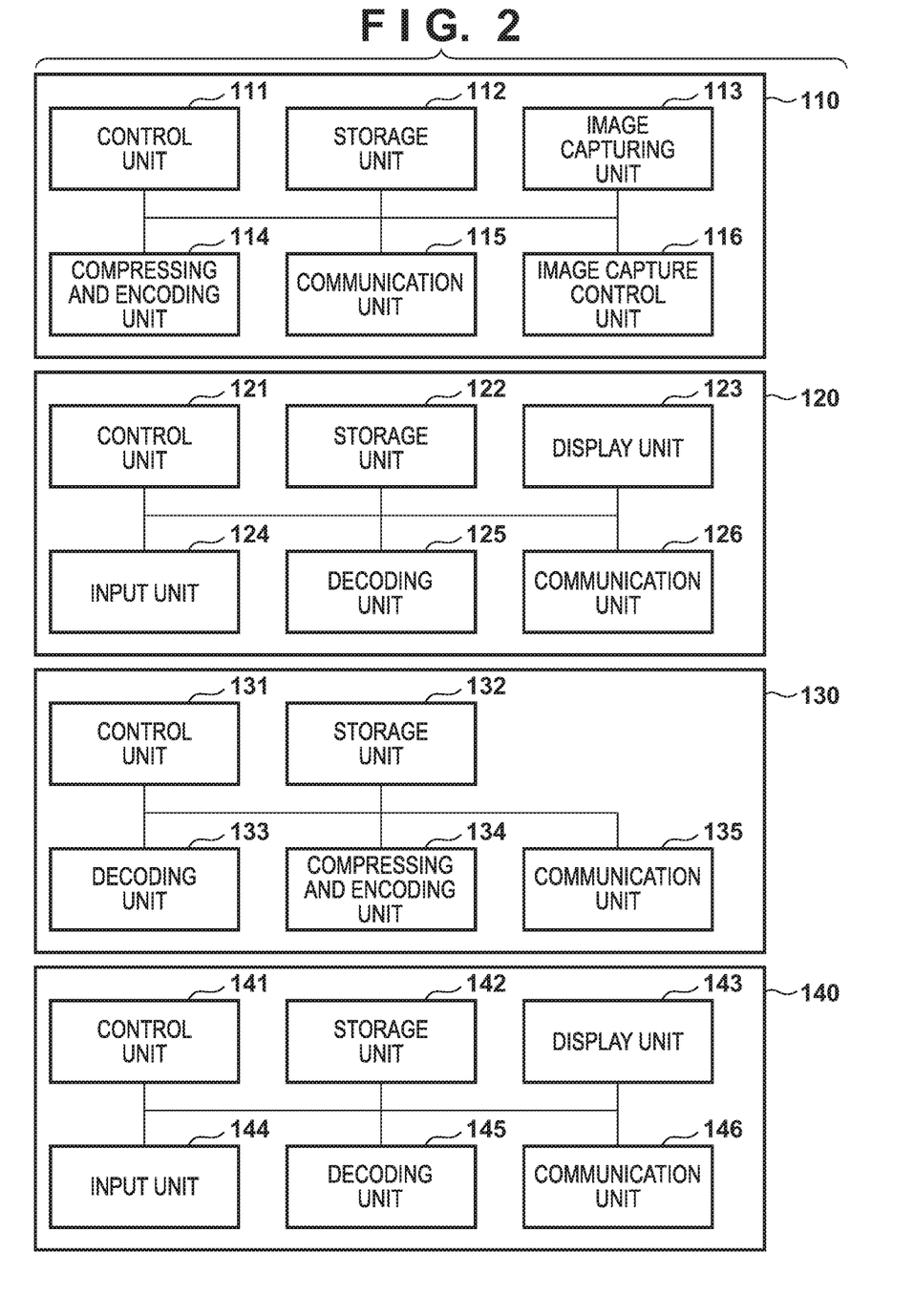
FIG. 2 illustrates an example of the functional configuration of the monitoring camera 110, a setting client 120, a cloud server 130, and a user client 140 corresponding to the exemplary embodiment.

Next, functional configurations of respective nodes forming the system 10 will be described, referring to FIG. 2. FIG. 2 includes a diagram illustrating an example of the functional configuration of the monitoring camera 110. In the monitoring camera 110, a control unit 111, which performs overall control of the monitoring camera 110, includes the CPU 201, for example. The storage unit 112, being formed of the primary storage device 202 and the secondary storage device 203, for example, is used as: a storage area of programs to be executed mainly by the control unit 111, a work area used during execution of a program, or a storage area of camera setting values such as cloud connection settings, privacy mask settings, or PTZ movable range settings; or of an HTML page for making various settings. In addition, the storage unit 112 is also used as a storage area for various data, such as a storage area for image data generated by an image capturing unit 113 described below.

The image capturing unit 113, being formed of the camera unit 206, the image capture interface 205, or the like, converts analog signals acquired by image capturing an image of a subject imaged by an image capturing optical system of the monitoring camera 110 into digital data and outputs the digital data to the storage unit 112. When the captured image is output to the storage unit 112, the control unit 111 receives an image acquisition event from the image capturing unit 113. A compressing and encoding unit 114 performs a compressing and encoding process based on a format such as JPEG, H.264 or the like on the captured image output from the image capturing unit 113, so as to generate image data of static images or video and to output the image data to the storage unit 112. A communication unit 115 performs communication with external devices. For example, the communication unit 115 is used when receiving respective control commands from an external device or when transmitting responses to the respective control commands or images to the external device. Upon receiving a command from an external device, the control unit 111 receives a command reception event from the communication unit 115. An image capture control unit 116 is used to change the image capturing area of the image capturing unit 113 to tilt drive, pan drive, or zoom drive, according to pan, tilt, or zoom values input by the control unit 111.

Next, FIG. 2 includes a diagram illustrating an example of the functional configuration of the setting client 120. In the setting client 120, a control unit 121, being formed of a CPU, for example, performs overall control of the setting client 120. A storage unit 122, being formed of a ROM, a RAM, a hard disk, or the like, for example, is used as: a storage area of programs to be executed mainly by the control unit 121, a work area or the like used during execution of a program, or a storage area of various data such as cloud connection settings, privacy mask settings, PTZ movable range settings, or the like of the monitoring camera 110. A display unit 123, being formed of an LCD, an organic EL display, or the like, for example, provides the user with the presentation of: a viewer screen of images received from the monitoring camera 110, an HTML page for making various settings of the monitoring camera 110, various messages, or the like. An input unit 124, being formed of a button, a cross key, a touch panel, a mouse, or the like, for example, accepts operation input from the user and notifies the control unit 121 of the content of the input. A decoding unit 125 decodes, based on a format such as JPEG, H.264, or the like, image data of compressed and encoded static images and video received via a communication unit 126 and decompresses the decoded image data in the storage unit 122. The communication unit 126 performs communication with external devices. For example, the communication unit 126 is used when transmitting: a command requesting an HTML page for making various settings of the monitoring camera 110; or respective control commands such as cloud connection settings, privacy mask settings, PTZ movable range settings, or the like to the monitoring camera 110 or is used when receiving responses to the respective control commands or images from the monitoring camera 110.

Next, FIG. 2 includes a diagram illustrating an example of the functional configuration of the cloud server 130. In the cloud server 130, a control unit 131 being formed of a CPU, for example, performs overall control of the cloud server 130. A storage unit 132, being formed of a ROM, a RAM, a hard disk, or the like, for example, is used as: a storage area of programs to be executed mainly by the control unit 131, a work area or the like used during execution of a program, or a storage area of various data such as image received from the monitoring camera 110, various settings of the monitoring camera 110 received from the user client 140, or the like. A decoding unit 133 decodes, based on a format such as JPEG, H.264, or the like, image data of compressed and encoded static images and video received from the monitoring camera 110 via a communication unit 135 and decompresses the decoded image data in the storage unit 132. A compressing and encoding unit 134 performs a compressing and encoding process based on a format such as JPEG, H.264, or the like on the image data received from the monitoring camera 110 and stored in the storage unit 132, so as to generate image data of static images or video and to output the image data to the storage unit 132. The communication unit 135 performs communication with external devices. For example, the communication unit 135 is used when receiving respective control commands from an external device or when transmitting responses to the respective control commands or images to the external device. When a command is received from an external device, the control unit 131 receives a command reception event from the communication unit 135.

Next, FIG. 2 includes a diagram illustrating an example of the functional configuration of the user client 140. In the user client 140, a control unit 141, being formed of a CPU, for example, performs overall control of the user client 140. A storage unit 142, being formed of a ROM, a RAM, hard disk, or the like, for example, is used as: a storage area of programs to be executed mainly by the control unit 141, a work area or the like used during execution of a program, or a storage area of various data such as various settings of the monitoring camera 110 or the like. A display unit 143, being formed of an LCD, an organic EL display, or the like, for example, provides the user with presentation of: a viewer screen of images received from the cloud server 130, a setting screen for making various settings of the monitoring camera 110, various messages, or the like. An input unit 144 including, for example, a button, a cross key, a touch panel, a mouse, or the like, accepts operation input from the user and notifies the control unit 141 of the content of the input. A decoding unit 145 decodes, based on a format such as JPEG, H.264, or the like, image data of compressed and encoded static images and video received via a communication unit 146 and decompresses the decoded image data in the storage unit 142. The communication unit 146 performs communication with external devices. For example, the communication unit 146 is used when transmitting image acquisition requests or commands to make various settings of the monitoring camera 110 to the cloud server 130 or is used when receiving responses to respective control commands or images from the cloud server 130.

Although the functional configurations of the monitoring camera 110, the setting client 120, the cloud server 130, and the user client 140 have been explained in the foregoing description, each of functional block diagrams illustrated in FIG. 2 merely depicts an example of embodiments of the monitoring camera 110, the setting client 120, the cloud server 130, and the user client 140, and the functional configurations are not limited thereto. Various modifications and changes are possible, such as inclusion of an audio input unit, an audio output unit, and an image analysis unit.

Figure 3:
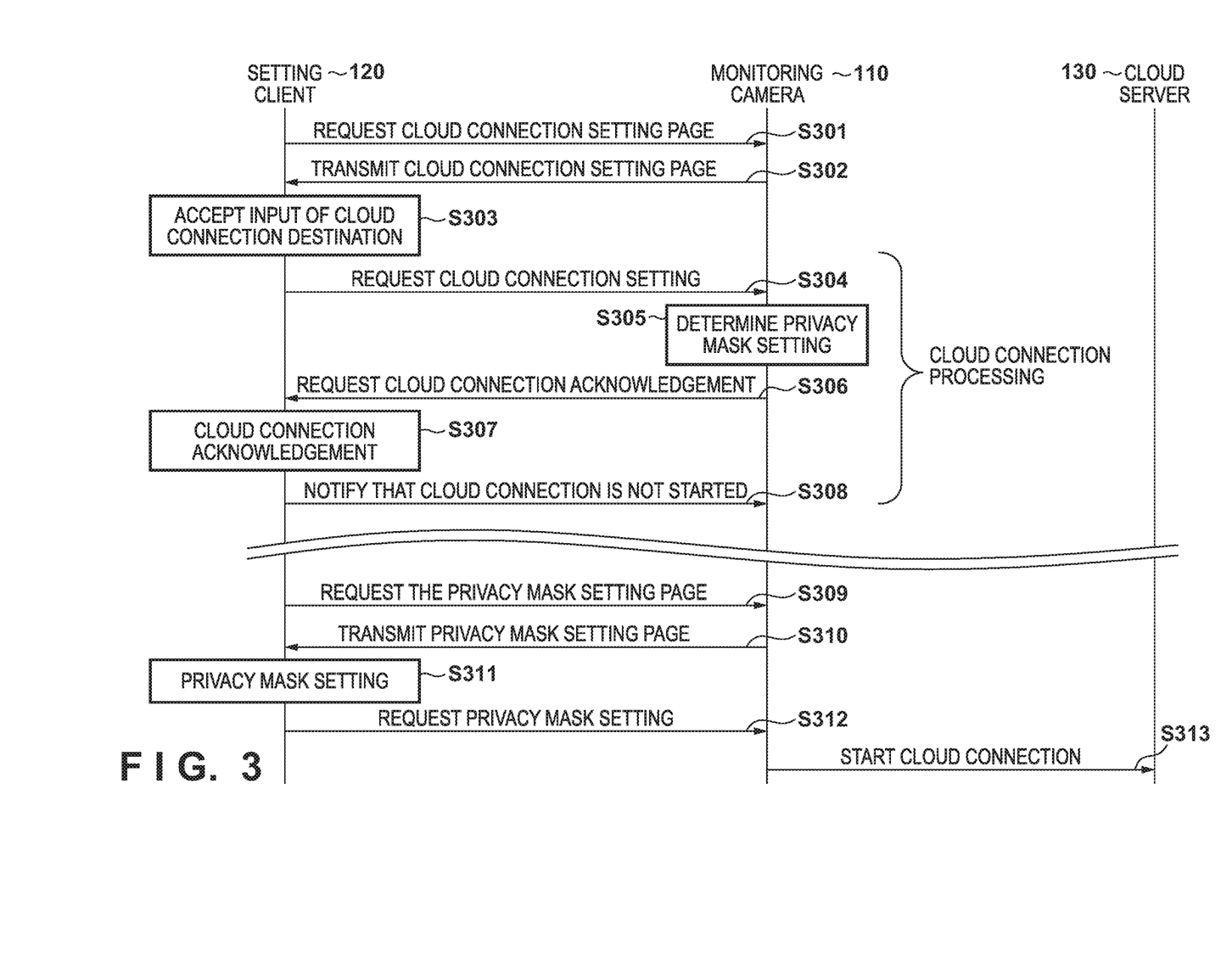
FIG. 3 illustrates an example of a process sequence through the monitoring camera 110, the setting client 120, and the cloud server 130, corresponding to the exemplary embodiment.
Figure 4:
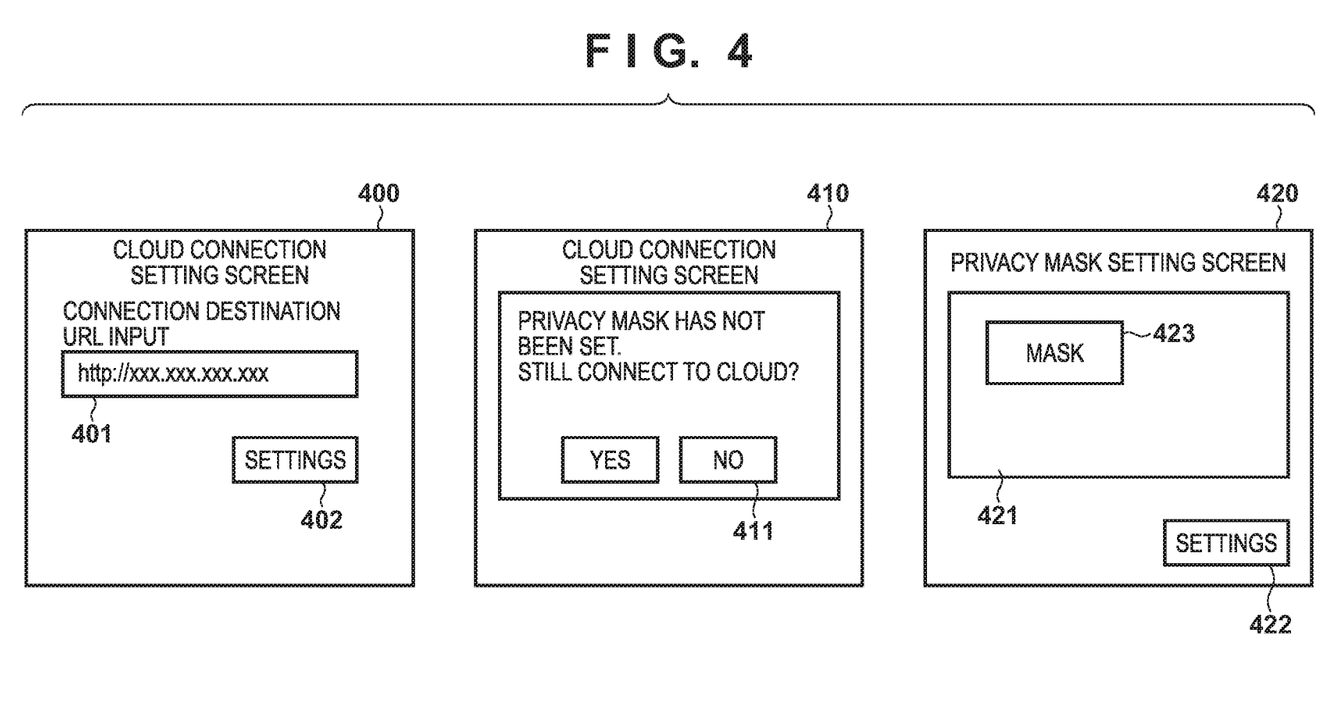
FIG. 4 illustrates an example of a setting screen on the setting client corresponding to the exemplary embodiment.

Next, referring to FIGS. 3 and 4, described is a sequence when the monitoring camera 110 starts a cloud connection to the cloud server 130 upon receiving a cloud connection setting request and a privacy mask setting request from the setting client 120.

First, the setting client 120 transmits, at S301, a request to acquire a cloud connection setting page in order to make cloud connection settings from the communication unit 126. Upon receiving the aforementioned request via the communication unit 115, the monitoring camera 110 acquires a cloud connection setting page from the storage unit 112 via the control unit 111 and transmits, at S302, the cloud connection setting page to the setting client 120 via the communication unit 115. Upon the setting client 120 receiving the cloud connection setting page via the communication unit 126, the control unit 121 displays, at S303, the cloud connection setting screen on the display unit 123 and accepts input of the cloud connection destination from the administrator user making settings (initial settings) of the monitoring camera 110. An example of the screen displayed on this occasion is illustrated in a cloud connection setting screen 400 of FIG. 4. On the screen 400 are displayed a connection destination URL input field 401 and a setting button 402. The administrator user can use the input unit 124 to input a predetermined cloud connection destination URL to the connection destination URL input field 401 of the cloud server 130 and can input the cloud connection destination by operating the settings button 402. Upon entry of a URL of the cloud connection destination in the aforementioned manner, the setting client 120 transmits, at S304, a cloud connection setting request to the monitoring camera 110 via the communication unit 126.

Upon the monitoring camera 110 receiving the cloud connection setting request via the communication unit 115, the control unit 111 performs a cloud connection process. In the cloud connection process, it is first determined at S305 whether a privacy mask has been set. On this occasion, in a case where it is determined that the privacy mask has not been set, a cloud connection acknowledgement request is transmitted, at S306, to the setting client 120 via the communication unit 115 in order to inquire the cloud connection acknowledgement. Although not illustrated in FIG. 3, the control unit 111 starts a cloud connection in a case where a privacy mask has been set.

Upon the setting client 120 receiving the cloud connection acknowledgement request via the communication unit 126, the control unit 121 performs cloud connection acknowledgement at S307. In cloud connection acknowledgement, the setting client 120 displays a cloud connection acknowledgement screen on the display unit 123 and accepts input of an instruction whether to make a cloud connection from the administrator user making the initial settings of the monitoring camera 110. An example of the screen displayed on this occasion is illustrated in a cloud connection acknowledgement screen 410 of FIG. 4. On the screen 410 are displayed a button group 411 for inputting an instruction whether to make a cloud connection, together with a message inquiring whether to make a cloud connection despite that the privacy mask has not been set. The administrator user can use the input unit 124 to select "yes" or "no" and can determine whether to start a cloud connection. Generally, it is desirable not to make a cloud connection in a case where there exists a part that should be concealed in the captured image with the privacy mask remaining unset. Therefore, a case where "no" is selected will be described below.

When it is selected not to start a cloud connection in the cloud connection acknowledgement, the control unit 121 transmits, to the monitoring camera 110 via the communication unit 126 at S308, a notification of not to start a cloud connection. Upon receiving the notification of not to start a cloud connection via the communication unit 115, the monitoring camera 110 terminates the cloud connection process immediately without making a cloud connection.

Subsequently, when the administrator user is making settings of the privacy mask, the control unit 121 transmits, at S309, a privacy mask setting page acquisition request to the monitoring camera 110 via the communication unit 126. Upon the monitoring camera 110 receiving the request via the communication unit 115, the control unit 111 acquires a privacy mask setting page from the storage unit 112 and transmits, at S310, the privacy mask setting page to the setting client 120 via the communication unit 115.

Upon the setting client 120 receiving the privacy mask setting page via the communication unit 126, the control unit 121 displays, at S311, a privacy mask setting screen on the display unit 123 and accepts privacy mask settings from the administrator user. An example of the screen displayed on this occasion is illustrated on a privacy mask setting screen 420 of FIG. 4. On the screen 420 are displayed an image display area 421 for displaying a sample of an image captured by the monitoring camera 110 and a setting button 422. The administrator user can use the input unit 124 to set, by dragging operation or the like, a privacy mask 423 in a freely selected area on the image displayed in the image display area 421. When the position and the size of the mask 423 are determined, it is possible to set the privacy mask by operating the setting button 422. Upon setting the privacy mask in the aforementioned manner, the setting client 120 transmits, at S312, a privacy mask setting request via the communication unit 126.

Upon the monitoring camera 110 receiving the privacy mask setting request via the communication unit 115, the control unit 111 extracts information of the privacy mask included in the setting request and stores the privacy mask settings in the storage unit 112. Subsequently, at S313, the control unit 111 starts a connection to the cloud server 130 based on the content of the cloud connection settings received from the setting client 120 via the communication unit 115 at S304. In the present embodiment, the cloud connection operation is automatically started in response to the reception of a privacy mask setting request without duplicately accepting a cloud connection instruction.

Figure 5:
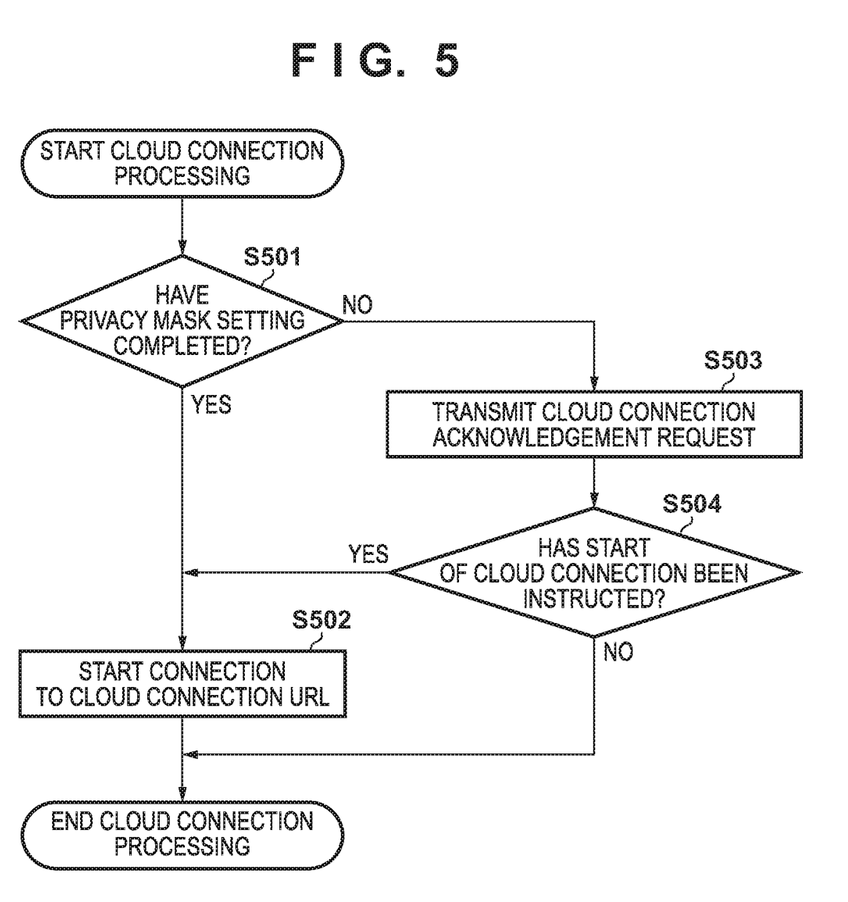
FIG. 5 is a flowchart illustrating an example of processing in the monitoring camera 110 corresponding to the exemplary embodiment.

Next, referring to the flowchart of FIG. 5, there will be described a flow of the cloud connection process in the monitoring camera 110 according to the present embodiment. FIG. 5 is a flowchart illustrating an example of the cloud connection process corresponding to the embodiment.

The process corresponding to the flowchart can be realized by executing by the CPU 201 a corresponding program (stored in the secondary storage device 203), for example.

At S501, the control unit 111 of the monitoring camera 110 acquires privacy mask settings from the storage unit 112 and determines whether the setting has been completed. In a case where it is determined that the privacy mask has been set, the process flow proceeds to S502, or the process flow proceeds to S503 in a case where it is determined as not set. At S502, the control unit 111 of the monitoring camera 110 acquires a cloud connection destination URL included in the cloud connection settings from the storage unit 112, starts a connection to the cloud connection destination URL via the communication unit 115, makes a connection to the cloud server 130, and terminates the process.

At S503, the control unit 111 of the monitoring camera 110 transmits a cloud connection acknowledgement request to the setting client 120 via the communication unit 115. Subsequently, upon receiving a notification of whether to start a cloud connection from the setting client 120 via the communication unit 115 of the monitoring camera 110, the control unit 111 determines at S504 whether it has been instructed to start a cloud connection based on the notification content. In a case where a start of a cloud connection has been instructed, the process flow proceeds to S502, or the process is terminated in a case where a cloud connection is not to be started. As thus described, in a case where a privacy mask has not been set, the cloud connection is suppressed unless a cloud connection instruction is issued from the administrator user.

According to the present embodiment described above, it is possible to prevent an unintentional cloud connection by providing cloud connection acknowledgement to the administrator user in a case where the privacy mask has not been set, upon the monitoring camera 110 receiving cloud connection settings from the setting client 120. In addition, the monitoring camera 110 automatically starts a connection to the cloud server 130 upon receiving privacy mask settings by the setting client 120 after having made cloud connection settings, and therefore the administrator no longer needs to duplicately issue a cloud connection instruction and is relieved of the workload for starting a cloud connection.

Embodiment 2

Next, a second embodiment will be described. In the aforementioned first embodiment, the timing of cloud connection is controlled in accordance with the privacy mask settings. In the present embodiment, described is a case where the timing of cloud connection is controlled in accordance with the PTZ movable range settings. The system configuration corresponding to the present embodiment is similar to that illustrated in FIGS. 1 and 2.

Hereinafter, referring to FIG. 6 and FIG. 7, described is a sequence when the monitoring camera 110 starts a cloud connection to the cloud server 130 upon receiving a cloud connection setting request and a PTZ movable range setting request from the setting client 120.

Figure 6:
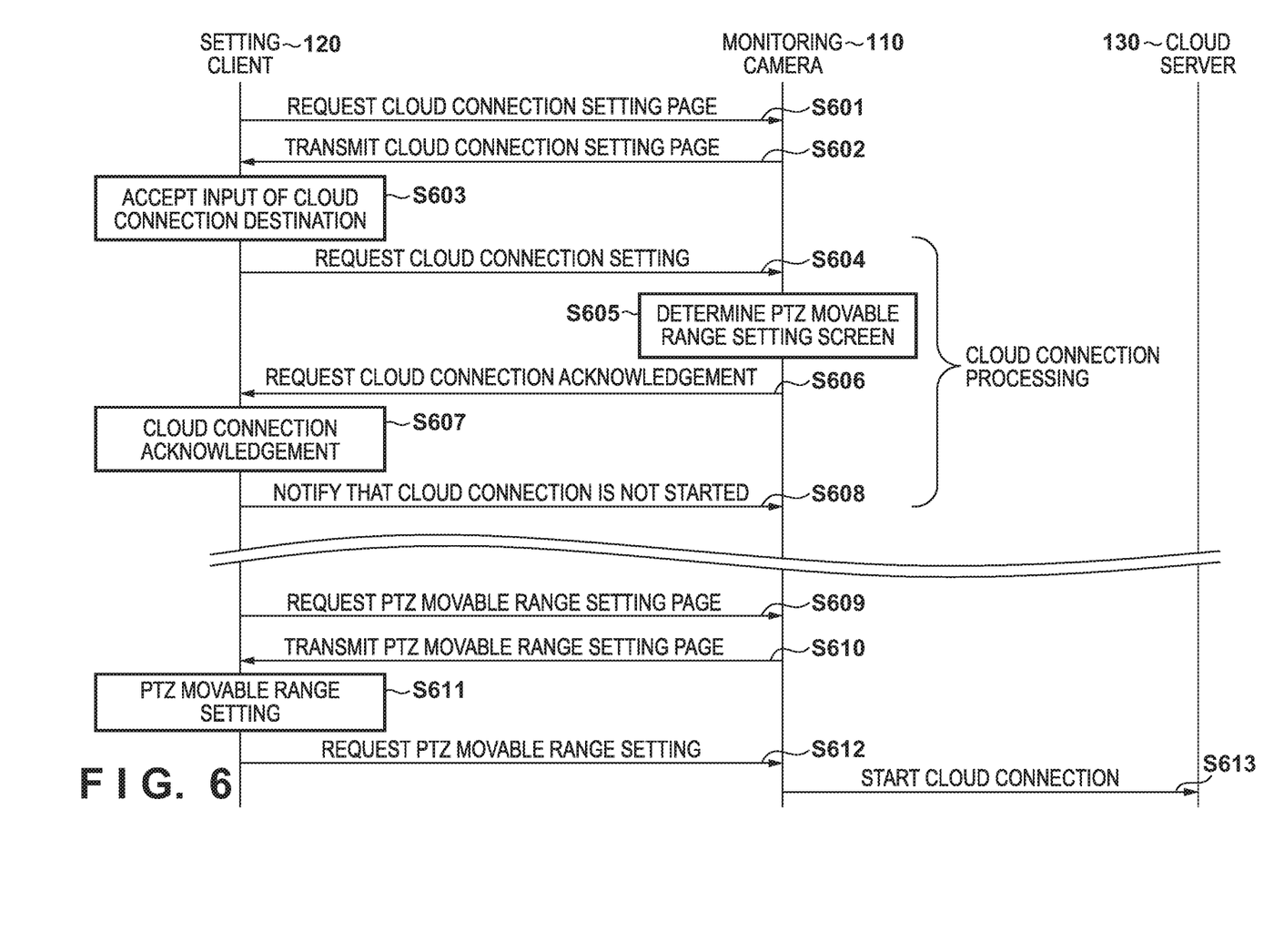
FIG. 6 illustrates another example of a process sequence through the monitoring camera 110, the setting client 120, and the cloud server 130, corresponding to the exemplary embodiment.
Figure 7:
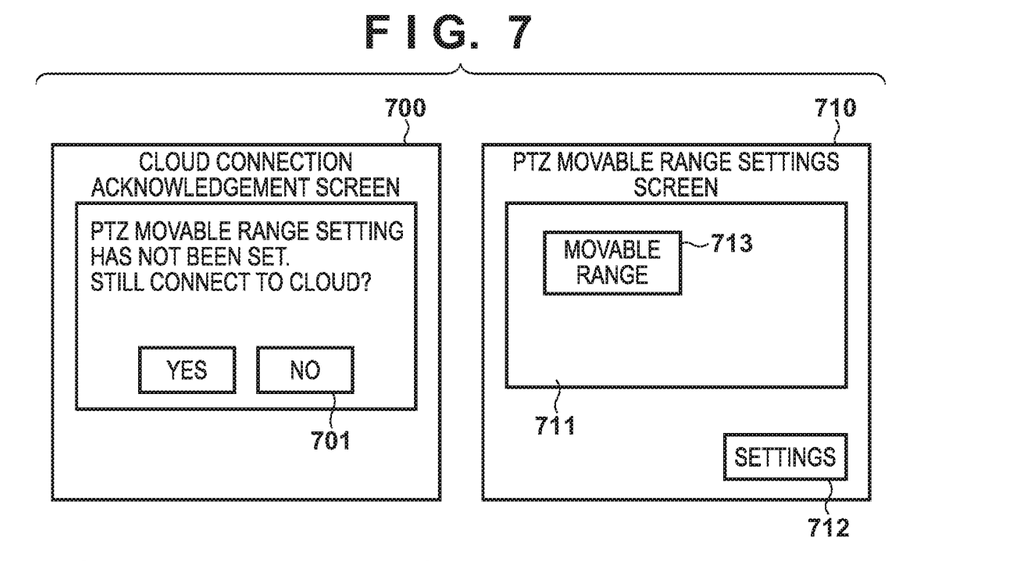
FIG. 7 illustrates another example of the setting screen on the setting client corresponding to an exemplary embodiment.

In FIG. 6, the processes from S601 to S604 are similar to the processes from S301 to S304 of FIG. 3. Upon the monitoring camera 110 receiving the cloud connection setting request via the communication unit 115, the control unit 111 performs a cloud connection process. At S605, the control unit 111 determines whether a PTZ movable range has been set. On this occasion, in a case where it is determined that the PTZ movable range has not been set, the control unit 111 transmits, at S606, a cloud connection acknowledgement request to the setting client 120 via the communication unit 115 in order to inquire the cloud connection acknowledgement.

Upon the setting client 120 receiving the cloud connection acknowledgement request via the communication unit 126, the control unit 121 performs cloud connection acknowledgement at S607. In cloud connection acknowledgement, the setting client 120 displays a cloud connection acknowledgement screen on the display unit 123 and accepts input of an instruction whether to make a cloud connection from the administrator user making the initial settings of the monitoring camera 110. An example of the screen displayed on this occasion is illustrated in a cloud connection acknowledgement screen 700 of FIG. 7. On the screen 700 are displayed a button group 701 for inputting an instruction whether to make a cloud connection, together with a message inquiring whether to make a cloud connection despite that the PTZ movable range has not been set. The administrator user can use the input unit 124 to select either "yes" or "no" and can determine whether to start a cloud connection. In the following, a case where "no" is selected will be described.

When it is selected not to start a cloud connection in the cloud connection acknowledgement, the control unit 121 transmits, to the monitoring camera 110 via the communication unit 126 at S608, a notification of not to start a cloud connection. Upon receiving the notification of not to start a cloud connection via the communication unit 115, the monitoring camera 110 terminates the cloud connection process immediately without making a cloud connection.

Subsequently, when the administrator user is making settings of the PTZ movable range, the control unit 121 transmits, at S609, a PTZ movable range setting page acquisition request to the monitoring camera 110 via the communication unit 126. Upon the monitoring camera 110 receiving the request via the communication unit 115, the control unit 111 acquires a PTZ movable range setting page from the storage unit 112 and transmits, at S610, the PTZ movable range setting page to the setting client 120 via the communication unit 115.

Upon the setting client 120 receiving the PTZ movable range setting page via the communication unit 126, the control unit 121 displays, at S611, a PTZ movable range setting screen on the display unit 123 and accepts a PTZ movable range settings from the administrator user. An example of the screen displayed on this occasion is illustrated in a PTZ movable range setting screen 710 of FIG. 7. On the screen 710 are displayed an image display area 711 for displaying a sample of a panoramic image captured by the monitoring camera 110 and a setting button 712. The panoramic image is generated by synthesizing images captured by the monitoring camera 110, based on the operable range of pan, tilt, and zoom. The administrator user can use the input unit 124 to set a frame 713 in a freely selected area on the panoramic image displayed in the image display area 711.

The control unit 121 can calculate the value of pan, tilt, and zoom, based on the position and the size of the frame 713 in the panoramic image. Upon the position and the size of the frame 713 being determined, the PTZ movable range can be set by operating the setting button 712. Upon the PTZ movable range being set in the aforementioned manner, the setting client 120 transmits, at S612, a PTZ movable range setting request via the communication unit 126. Note that the PTZ movable range setting method is not limited thereto and that the PTZ of the monitoring camera 110 may be adjusted using the PTZ movable range setting screen 710, and the PTZ movable range may be set based on the adjustment result. Alternatively, a numerical value of the PTZ may be input according to a predetermined method.

Upon the monitoring camera 110 receiving the PTZ movable range setting request via the communication unit 115, the control unit 111 extracts a PTZ movable range setting value included in the setting request and stores the setting value in the storage unit 112. Subsequently, at S613, the control unit 111 starts a connection to the cloud server 130 based on the content of the cloud connection settings received from the setting client 120 via the communication unit 115 at S604. In the present embodiment, the cloud connection operation is automatically started in response to the reception of a PTZ movable range setting request without duplicately accepting a cloud connection instruction.

Figure 8:
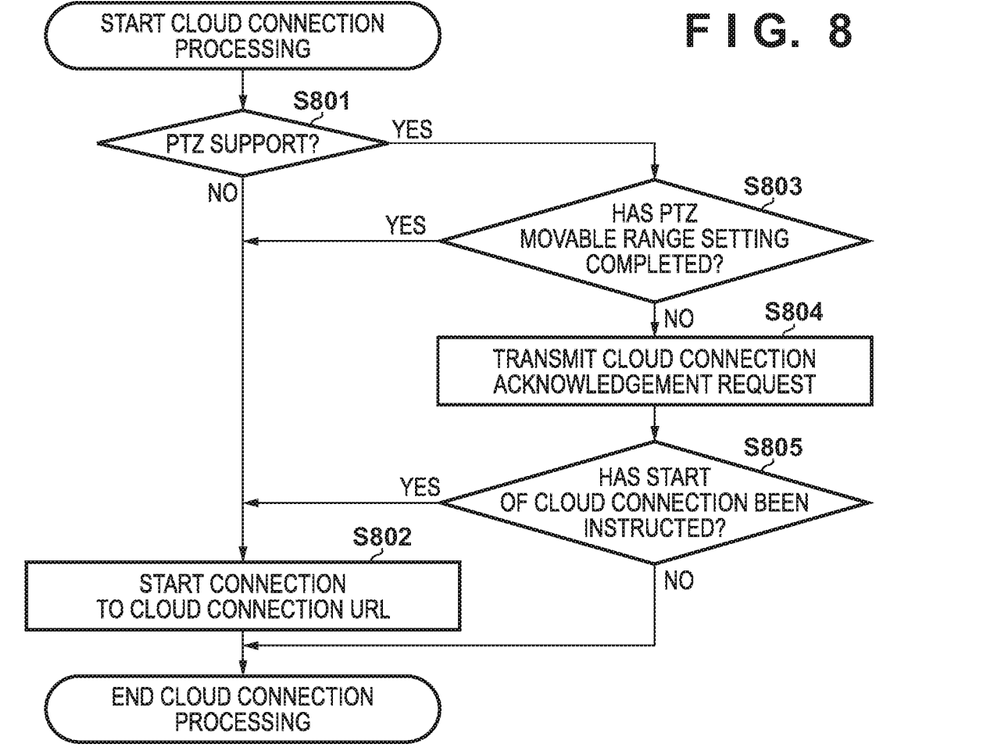
FIG. 8 is a flowchart illustrating an example of processing in the monitoring camera 110 corresponding to the exemplary embodiment.

In the following, described is a flow of the cloud connection process in the monitoring camera 110 according to the present embodiment, referring to the flowchart of FIG. 8. FIG. 8 is a flowchart illustrating an example of the cloud connection process corresponding to the present embodiment.

First, at S801, the control unit 111 of the monitoring camera 110 determines whether the monitoring camera 110 supports PTZ. Specifically, the control unit 111 acquires, from the storage unit 112, support information indicating whether the monitoring camera 110 supports the PTZ and determines based on the value of the support information. In a case where PTZ is not supported, the process flow proceeds to S802, or the process flow proceeds to S803 in a case where PTZ is supported.

At S802, the control unit 111 of the monitoring camera 110 acquires a cloud connection destination URL included in the cloud connection settings from the storage unit 112, starts a connection to the cloud connection destination URL via the communication unit 115, makes a connection to the cloud server 130, and terminates the process. At S802, the control unit 111 acquires a setting value for the PTZ movable range from the storage unit 112 and determines whether the setting has been completed. In a case where it is determined that the PTZ movable range has been set, the process flow proceeds to S802, or the process flow proceeds to S804 in a case where it is determined as not set.

At S804, the control unit 111 of the monitoring camera 110 transmits a cloud connection acknowledgement request to the setting client 120 via the communication unit 115. Subsequently, upon receiving a notification of whether to start a cloud connection from the setting client 120 via the communication unit 115 of the monitoring camera 110, the control unit 111 determines, at S805, whether it has been instructed to start a cloud connection based on the notification content. In a case where a start of a cloud connection has been instructed, the process flow proceeds to S802, or the process is terminated in a case where the cloud connection is not to be started. As thus described, in a case where a PTZ movable range has not been set, the cloud connection is suppressed unless a cloud connection instruction is issued from the administrator user.

As has been described above, in the present embodiment, it is possible to prevent an unintentional cloud connection by providing cloud connection acknowledgement to the administrator user in a case where the PTZ movable range has not been set, upon the monitoring camera 110 receiving cloud connection settings from the setting client 120. In addition, the monitoring camera 110 automatically starts a connection to the cloud server 130 upon receiving PTZ movable range settings by the setting client 120 after having made cloud connection settings, and therefore the administrator no longer needs to duplicately issue a cloud connection instruction and is relieved of the workload for starting a cloud connection.

Modification Example

In the aforementioned first and second embodiments, there has been described a case where the timing of cloud connection is controlled based on whether a predetermined setting on the image captured by the monitoring camera has been made in the monitoring camera 110, such as a setting of the privacy mask, a setting of the PTZ movable range, or the like. However, the setting that can be a basis for the timing control is not limited to the aforementioned two approaches, and approaches other than those descried above may also be included. In addition, the predetermined setting need not be a single setting, and a cloud connection may be made after all of a plurality of settings have been made.

Furthermore, with a plurality of settings being preliminarily prepared as the aforementioned predetermined setting, the administrator user may be prompted to freely select one or more settings from the plurality of settings and suspend a cloud connection until all of the selected settings have been made. In this case, provided that three settings are selected, for example, the monitoring camera 110 can start a cloud connection when all of the three settings have been completed and a setting request as to the setting made last is transmitted from the setting client 120 to the monitoring camera 110.

The present invention is not limited to the aforementioned embodiments, and various changes and modifications can be made without departing from the spirit and scope of the present invention. Therefore, the following claims are appended in order for the scope of the invention to be made public.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-073075 filed on Apr. 5, 2019 which is hereby incorporated by reference herein in its entirety.

What is claimed is:

1. An image capturing apparatus, comprising:
an image capturing unit;
a communication unit configured to be communicable with a cloud server via at least an Internet and with a client apparatus via a local network; and
a control unit configured to control communication by the communication unit,
wherein the control unit determines whether a predetermined setting has been made on the image capturing apparatus, upon receiving, from the client apparatus via the local network, a connection request for connecting the image capturing apparatus and the cloud server via the Internet, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction, and
the control unit,
upon determining that the predetermined setting has been made, controls the communication unit to connect to the cloud server via the Internet, according to the connection request, and
upon determining that the predetermined setting has not been made, controls the communication unit to connect to the cloud server via the Internet according to the connection request, after the predetermined setting has been made or after having received a further instruction for connecting the image capturing apparatus and the cloud server via the Internet.

2. The image capturing apparatus according to claim 1, wherein the control unit,
upon determining that the predetermined setting has not been made, transmits, to the client apparatus, an inquiry whether to connect the image capturing apparatus and the cloud server via the Internet, and
when not accepting an instruction to connect from the client apparatus in response to the inquiry, controls the communication unit to connect to the cloud server without accepting a further instruction from the client apparatus after the predetermined setting has been made.

3. The image capturing apparatus according to claim 1, wherein the predetermined setting includes one or more settings, and
the control unit controls the communication unit to connect to the cloud server after all of the one or more settings have been made.

4. The image capturing apparatus according to claim 3, wherein the one or more settings are settings selected from a plurality of settings by a user of the client apparatus.

5. The image capturing apparatus according to claim 1, wherein the communication unit communicates with the cloud server via the local network and the Internet.

6. The image capturing apparatus according to claim 1, wherein the communication unit transmits an image generated based on the predetermined setting to the cloud server, after the predetermined setting has been made.

7. The image capturing apparatus according to claim 1, wherein the local network is connected to the Internet via a firewall.

8. A client apparatus comprising:
a communication unit configured to be communicable with an image capturing apparatus having an image capturing unit via a local network and with a cloud server via an Internet; and
a control unit configured to control communication by the communication unit,
wherein the control unit performs a process for causing a display unit to display a screen for determining whether to connect the image capturing apparatus and the cloud server via the Internet, after an instruction has been issued by a user to connect the image capturing apparatus and the cloud server via the Internet, in a case where a predetermined setting has not been made to the image capturing apparatus, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction, and
the control unit causing, in a case where the instruction for connecting the image capturing apparatus and the cloud server via the Internet is provided on the screen, a further instruction for connecting the image capturing apparatus and the cloud server via the Internet to be transmitted from the communication unit to the image capturing apparatus.

9. The client apparatus according to claim 8, wherein the predetermined setting includes one or more settings.

10. The client apparatus according to claim 9, wherein the one or more settings are settings selected from a plurality of settings by the user.

11. The client apparatus according to claim 8, wherein the image capturing apparatus performs communication with the cloud server via the local network and the Internet.

12. The client apparatus according to claim 8, wherein the communication unit transmits an image generated based on the predetermined setting to the cloud server, after the predetermined setting has been made.

13. The client apparatus according to claim 8, wherein the local network is connected to the Internet via a firewall.

14. A method of controlling an image capturing apparatus having an image capturing unit, a communication unit configured to be communicable with a cloud server via at least an Internet and with a client apparatus via a local network, and a control unit configured to control communication by the communication unit,
the method comprising:
determining, by the control unit, whether a predetermined setting has been made on the image capturing apparatus, upon receiving, from the client apparatus via the local network, a connection request for connecting the image capturing apparatus and the cloud server via the Internet, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction;
controlling, by the control unit upon determining that the predetermined setting has been made, the communication unit to connect to the cloud server via the Internet, according to the connection request; and controlling, by the control unit upon determining that the predetermined setting has not been made, the communication unit to connect to the cloud server via the Internet according to the connection request, after the predetermined setting has been made or after having received a further instruction for connecting the image capturing apparatus and the cloud server via the Internet.

15. A method for controlling a client apparatus having: a communication unit configured to be communicable with an image capturing apparatus having an image capturing unit via a local network and with a cloud server via an Internet, and a control unit configured to control communication by the communication unit, the method comprising:

causing, by the control unit, a display unit to display a screen for determining whether to connect the image capturing apparatus and the cloud server via the Internet, after an instruction has been issued by a user to connect the image capturing apparatus and the cloud server via the Internet, in a case where a predetermined setting has not been made to the image capturing apparatus, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction; and causing, by the control unit, in a case where an instruction for connecting the image capturing apparatus and the cloud server via the Internet is provided on the screen, a further instruction for connecting the image capturing apparatus and the cloud server via the Internet to be transmitted from the communication unit to the image capturing apparatus.

16. A non-transitory computer-readable storage medium storing one or more program including instructions that, when executed by a processor of an image capturing apparatus, wherein the image capturing apparatus comprises: an image capturing unit, a communication unit configured to be communicable with a cloud server via at least an Internet and with a client apparatus via a local network, and a control unit configured to control communication by the communication unit, causes the control unit to perform operations of:

determining whether a predetermined setting has been made on the image capturing apparatus, upon receiving, from the client apparatus via the local network, a connection request for connecting the image capturing apparatus and the cloud server via the Internet, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction;

controlling, upon determining that the predetermined setting has been made, the communication unit to connect to the cloud server via the Internet, according to the connection request; and controlling, upon determining that the predetermined setting has not been made, the communication unit to connect to the cloud server via the Internet according to the connection request, after the predetermined setting has been made or after having received a further instruction for connecting the image capturing apparatus and the cloud server via the Internet.

17. A non-transitory computer-readable storage medium storing one or more program including instructions that, when executed by a processor of a client apparatus, wherein the client apparatus comprises: a communication unit configured to be communicable with an image capturing apparatus having an image capturing unit via a local network and with a cloud server via an Internet, and a control unit configured to control communication by the communication unit, causes the control unit to perform operations of:

causing a display unit to display a screen for determining whether to connect the image capturing apparatus and the cloud server via the Internet, after an instruction has been issued by a user to connect the image capturing apparatus and the cloud server via the Internet, in a case where a predetermined setting has not been made to the image capturing apparatus, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction, and causing, in a case where an instruction for connecting the image capturing apparatus and the cloud server via the Internet is provided on the screen, a further instruction for connecting the image capturing apparatus and the cloud server via the Internet to be transmitted from the communication unit to the image capturing apparatus.

18. An image capturing apparatus, comprising:

an image capturing unit;

a communication unit configured to be communicable with a cloud server via at least an Internet and with a client apparatus via a local network; and a control unit configured to control communication by the communication unit, wherein the control unit determines whether a predetermined setting has been made on the image capturing apparatus, when receiving, from the client apparatus via the local network, a request for setting a connection destination for the image capturing apparatus to connect the cloud server via the Internet, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction, and the control unit, in response to determining that the predetermined setting has been made, controls the communication unit to connect the cloud server of the connection destination via the internet according to the request, and in response to determining that the predetermined setting has not been made, controls the communication unit not to connect to the cloud server of the connection destination via the Internet according to the request and to transmit the determination result to the client apparatus.

19. A client apparatus comprising:

a communication unit configured to be communicable with an image capturing apparatus having an image capturing unit via a local network, wherein the image capturing apparatus is communicable with a cloud server via an Internet; and a control unit configured to control communication by the communication unit, wherein the control unit controls the communication unit:
to transmit, to the image capturing apparatus, a request for setting a connection destination for the image capturing apparatus to connect with the cloud server via the Internet and, in response to determining that a predetermined setting has not been made to the image capturing apparatus based on the request, to receive, from the image capturing apparatus, the determination result transmitted without connection of the image capturing apparatus to the cloud server of the connection destination and to perform a process for causing a display unit to display the determination result, wherein the predetermined setting includes at least one of:
a setting of a mask function for masking at least a part of an image captured by the image capturing unit; and
a setting of a limiting function for limiting a driving range of a driving unit that can drive the image capturing unit in a pan direction or a tilt direction, and wherein the image capturing apparatus connects with the cloud server of the connection destination in response to determining that the predetermined setting has been made to the image capturing apparatus.

20. A method of controlling an image capturing apparatus having an image capturing unit, a communication unit configured to be communicable with a cloud server via at least an Internet and with a client apparatus via a local network, and a control unit configured to control communication by the communication unit, the method comprising:
determining, by the control unit, whether a predetermined setting has been made on the image capturing apparatus, when receiving, from the client apparatus via the local network, a request for setting a connection destination for the image capturing apparatus to connect the cloud server via the Internet, wherein the predetermined setting includes at least one of: a setting of a mask function for masking at least a part of an image captured by the image capturing unit; and a setting of a limiting function for limiting a driving range of a driving unit that can drive the image capturing unit in a pan direction or a tilt direction; and controlling, by the control unit
in response to determining that the predetermined setting has been made, the communication unit to connect the cloud server of the connection destination via the Internet according to the request, and in response to determining that the predetermined setting has not been made, the communication unit not to connect to the cloud server of the connection destination via the Internet according to the request and to transmit the determination result to the client apparatus.

21. A method for controlling a client apparatus having: a communication unit configured to be communicable with an image capturing apparatus having an image capturing unit via a local network, wherein the image capturing apparatus is communicable with a cloud server via an Internet, and a control unit configured to control communication by the communication unit, the method comprising:
controlling, by the control unit, the communication unit:
to transmit, to the image capturing apparatus, a request for setting a connection destination for the image capturing apparatus to connect with the cloud server via the Internet; and, in response to determining that a predetermined setting has not been made to the image capturing apparatus based on the request, to receive, from the image capturing apparatus, the determination result transmitted without connection of the image capturing apparatus to the cloud server of the connection destination and to perform a process for causing a display unit to display the determination result, wherein the predetermined setting includes at least one of:
a setting of a mask function for masking at least a part of an image captured by the image capturing unit; and
a setting of a limiting function for limiting a driving range of a driving unit that can drive the image capturing unit in a pan direction or a tilt direction, and wherein the image capturing apparatus connects with the cloud server of the connection destination in response to determining that the predetermined setting has been made to the image capturing apparatus.

* * * * *